US009978011B2

(12) United States Patent
Jouper

(10) Patent No.: US 9,978,011 B2
(45) Date of Patent: May 22, 2018

(54) NETWORK SYSTEM FOR AUTONOMOUS DATA COLLECTION

(71) Applicant: Astronics Advanced Electronic Systems Corp., Kirkland, WA (US)

(72) Inventor: Jeffrey A. Jouper, Newcastle, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 1 day.

(21) Appl. No.: 15/427,131

(22) Filed: Feb. 8, 2017

(65) Prior Publication Data

US 2017/0255855 A1   Sep. 7, 2017

Related U.S. Application Data

(60) Provisional application No. 62/304,427, filed on Mar. 7, 2016.

(51) Int. Cl.
*G06K 19/077* (2006.01)
*G06K 19/07* (2006.01)
*G06Q 10/08* (2012.01)

(52) U.S. Cl.
CPC ... *G06K 19/07758* (2013.01); *G06K 19/0702* (2013.01); *G06Q 10/087* (2013.01)

(58) Field of Classification Search
None
See application file for complete search history.

(56) References Cited

U.S. PATENT DOCUMENTS

| 7,957,735 | B1* | 6/2011 | Lee ............... H04B 7/18506 455/431 |
| 9,302,781 | B2 | 4/2016 | Jouper et al. |
| 2008/0068171 | A1* | 3/2008 | Ehrman ............ G06Q 10/08 340/572.1 |

(Continued)

FOREIGN PATENT DOCUMENTS

EP   1879133 A1   1/2008

OTHER PUBLICATIONS

Wikipedia, Energy Harvesting, Feb. 8, 2016.

(Continued)

*Primary Examiner* — Kristy A Haupt
(74) *Attorney, Agent, or Firm* — Wiggin and Dana LLP; Gregory S. Rosenblatt; Matthew I. Burton

(57) ABSTRACT

A system to monitor and report asset inventory and status on board a vehicle, for example, an aircraft. This system has low weight and provides high reliability. Energy harvesting is provided for applications where it is difficult to connect to a power source. In one embodiment, a sensor communicates with the asset. An RFID tag is affixed to the asset and communicates with the asset. The RFID tag containing digitally stored information about the asset. An RFID reader mounted to the vehicle and positioned such that the RFID tag is within communication range with the RFID reader. A data delivery system effective to digitally transmit information from the RFID reader to a data collection system. A secure interface disposed between the data collection system and a communication system with the communication system effective to transmit the information to a flight crew, a ground crew and/or a display.

20 Claims, 7 Drawing Sheets

(56) References Cited

U.S. PATENT DOCUMENTS

2012/0038841 A1\* 2/2012 Taheri ................... H01L 31/055
                                                              349/25
2014/0002278 A1\* 1/2014 Boomgaarden ........ A62B 18/02
                                                              340/945
2014/0077952 A1\* 3/2014 Boss .................. G06Q 10/0832
                                                              340/572.1

OTHER PUBLICATIONS

Wikipedia, Service Set (802.11 Network), Feb. 16, 2016.
European Patent Office, EP 17158963.3, Extended European Search Report, Jun. 27, 2017.

\* cited by examiner

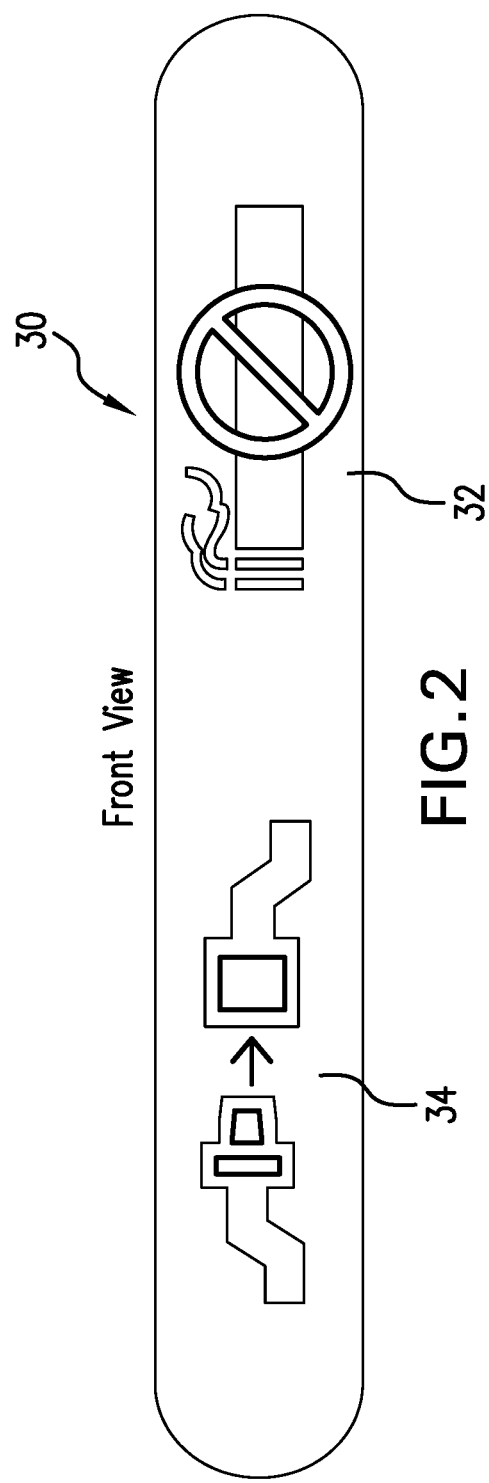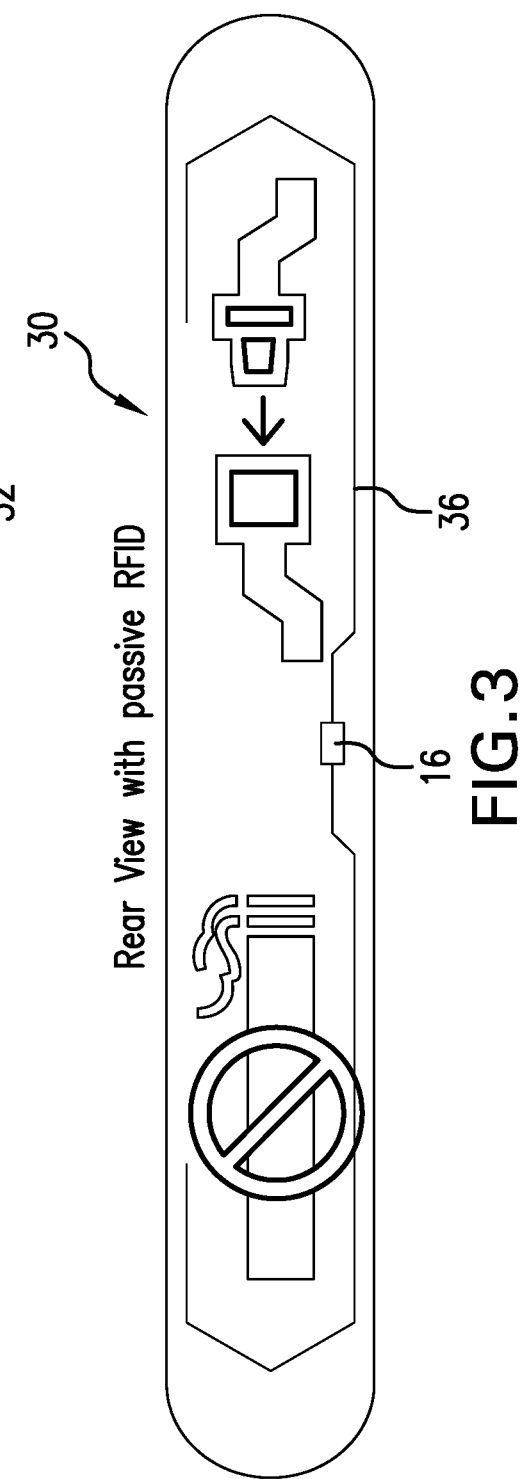

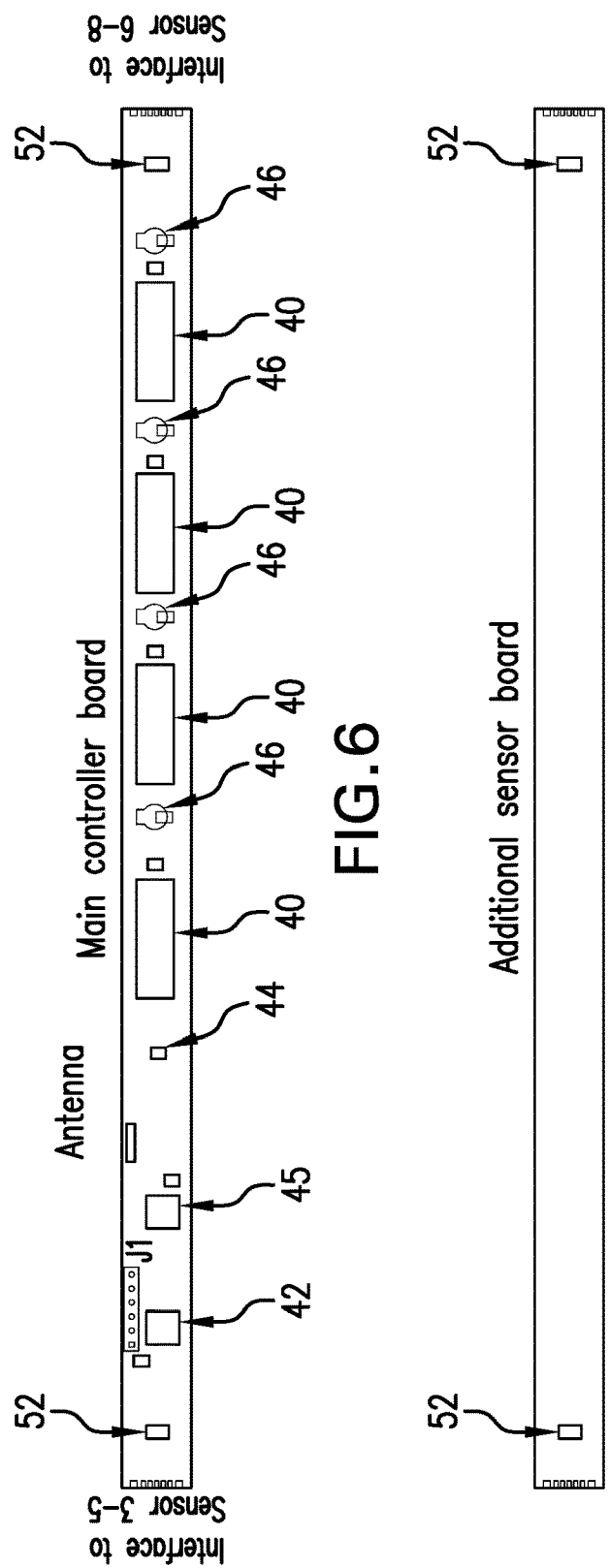

NETWORK SYSTEM FOR AUTONOMOUS
DATA COLLECTION

CROSS-REFERENCE TO RELATED PATENT
APPLICATIONS

This patent application is a non-provisional patent application claiming a benefit to the filing date of United States Provisional Patent Application Ser. No. 62/304,427 titled "Network System for Autonomous Data Collection" that was filed on Mar. 7, 2016. The disclosure of US 62/304,427 is incorporated by reference herein in its entirety.

BACKGROUND OF THE DISCLOSURE

Radio-frequency identification (RFID) uses electromagnetic fields to identify and track tags attached to objects. Tags are labels that are attached to an object and contain object-specific data. A tag usually contains an integrated circuit for storing and processing information and an antenna to receive and transmit a radio wave signal from a nearby RFID reader. There are both passive tags and active tags. Passive tags collect energy from a nearby RFID reader's radio waves. Active tags have a local power source and may operate at a considerable distance, up to several hundred meters, from the closest RFID reader.

Prior art RFID tag systems require an RFID reader, typically handheld, to activate the tag, gather information and download that information from the reader to a separate system. Information checks on an aircraft are typically done periodically, during aircraft maintenance / servicing and during aircraft turn arounds between flights. RFID tags are currently used to monitor critical systems such as oxygen bottles, life vests, life rafts and other safety equipment that have expiration dates. There are many other systems and components to an aircraft that will prevent the dispatch or flight of the aircraft that are not covered by existing systems.

United States Published Patent Application Publication No. 2014/0002278 A1 titled "Configuration and Monitoring System for an Aircraft Cabin Element, Fuselage and Aircraft Comprising Said System and Method of Monitoring an Aircraft," by Boomgaarden et al. discloses a system for monitoring the status of aircraft cabin elements utilizing a plurality of RFID devices and at least one repeater. The disclosure of US 2014/0002278 A1 is incorporated herein by reference in its entirety.

A sensor for monitoring seat occupancy on an aircraft is disclosed in U.S. Pat. No. 9,302,781, to Jouper et al., that is titled "Apparatus and Method to Monitor the Occupancy of Seating." A sensor for monitoring available storage bin volume on an aircraft is disclosed in United States Patent Application Publication No. 2015/0241209 A1, by Jouper et al., titled "Apparatus and Method to Monitor the Occupied Volume within a Fixed or Variable Volume." Both U.S. Pat. No. 9,302,781 and US 2015/0241209 A1 are incorporated by reference herein in their entireties.

BRIEF DESCRIPTION OF THE DRAWINGS

FIG. 2 illustrates a frontal view of a placard used on an aircraft.

FIG. 3 illustrates a rear view of the placard of FIG. 2 showing a tag with a passive RFID chip and antenna embedded in the chip.

FIG. 6 illustrates a small bin dual sensor system with energy harvesting

FIG. 7 illustrates a sensor board extender to add up to six sensors to the small bin dual sensor.

DETAILED DESCRIPTION

Disclosed is a system to monitor, catalog and report assets on board a vehicle, primarily targeted at aircraft. This system is advantageous where low weight and high reliability are required. Where it is difficult or impossible to connect a power system to power up sensors, this system is particularly suited. Many existing RFID tag reading systems, however, require the use of a handheld reader to communicate with the RFID tag to gain access to the information stored on the tag. In the case of aircraft, autonomous operation of the system is desirable to reduce aircraft crew workload, provide continuous data and/or report information periodically to a data collection system for reporting cabin system health.

The system includes a series of sensors or nodes, a plurality of RFID tags, near field or wireless communicator, a data collection system, an interface to the aircraft for collection of data and a method to send data to an off aircraft collection center. The data collection could also be accomplished through a handheld device wirelessly connected to the data collection system on the aircraft such as a tablet or cellular phone.

There exists a need for a system that can autonomously collect information from a number of sources through a point to point network, a mesh network or other applicable network from required placards, required devices, emergency equipment, non-required equipment and devices etc. and report this data to an automatic collection system for disposition.

Additional information such as stow bin volume sensors, passenger presence sensors, seat belt sensors, temperature sensors, vibration sensors, ambient light sensors, air pressure sensors, passenger power use information can also be collected to help make decisions on lighting, passenger loading, passenger power use etc.

Sensors can be either passive (RFID), or active (energy harvesting or powered). Energy harvesting sensors allow the placement of the sensor in locations that would otherwise not be possible. These sensors can be in surface mounted placards such as those that are used for seat belt and no smoking. Energy can be harvested from the back lighting and ambient lighting around the placard as well as placement of a RF energy harvesting antenna. Energy harvesting antennas capture and convert ambient RF energy emitted from RF sources such as Wireless Access Points (WAP) on board aircraft equipped with these systems. Each sensor harvests energy in the 10's of microwatts to periodically power the sensor and send information when requested. The same wireless system being harvested could provide the data path for information from the sensors.

Sensors on emergency equipment can harvest energy from vibration, solar or RF to transmit critical data such as last inspection date, health of the device (flashlight charge, oxygen bottle pressure, fire-extinguisher pressure).

Figure 1:
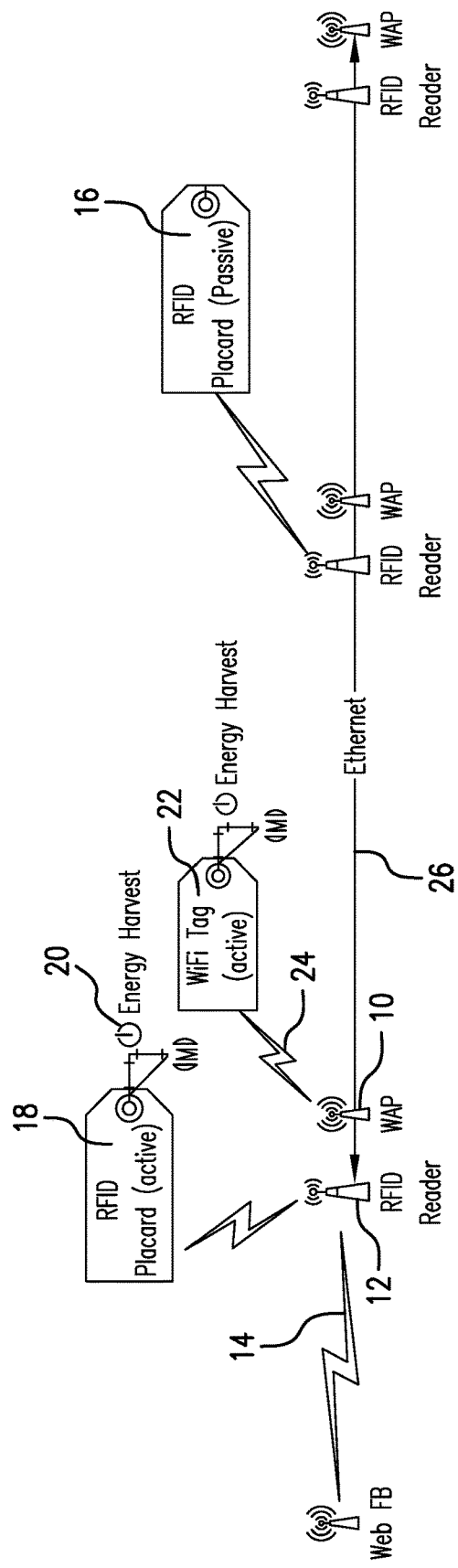
FIG. 1 illustrates an overview of the system disclosed herein.

FIG. 1 is an overview of one embodiment of the system. While installation on an aircraft is contemplated, other installations are within the scope of the disclosure and claims. It is desired to protect sensitive data on aircraft, so a closed network with secure subscriber identification is preferred. The backbone of the system is a data delivery system of wireless access points (WAPs) 10, RFID readers 12, secure WAP 14, RFID passive tags 16, RFID active tags 18 with energy harvesting 20, wireless powered energy harvesting tags 22 with wireless data interface 24, and either an Ethernet interconnect 26 between nodes or a wireless connection between nodes.

The data distribution and WAP portions of the system have been previously deployed on aircraft. This system adds one or more RFID readers 12 to access RFID devices 16, 18 removing the need for handheld devices and user intervention. The RFID reader is communicatively attached to WAPs for the collection of data and distribution to a system not physically attached to the RFID reader or the WAP.

Either passive RFID 16 or active RFID tags 18 with energy harvesting 20 are installed on equipment or devices to be tracked. Wireless tags 22 or nearfield enabled tags with energy harvesting 20 for environmental RF energy harvesting, solar, vibration, thermal or other adequate harvestable energy source is used to power the tag. The tags can be attached to any device that requires tracking. The tags can also be attached to sensor nodes where sensing of a parameter or action may be beneficial. Parameters that may benefit from sensing include temperature, seat belt status, stow bin usage, etc.

The number of RFID readers required varies dependent on the size and layout of the aircraft. A typical range for an RFID reader is 5 meters in all directions. This distance doubles in free air, when the line of sight is not obstructed. For a narrow body aircraft, an exemplary number of RFID readers is four. The readers are typically located in the crown of the aircraft adjacent WAPs for wireless transfer of data. These RFID readers are powered from either aircraft power or from an auxiliary port on the WAP. The WAP transfers the RFID data from the RFID reader to a server on the aircraft. Communication between the RFID reader and the WAP can be either wired or wireless as available in the system. The wireless network contains a hidden SSID (service set identifier). All data is encrypted from the sensor to the RFID reader, from the reader to the WAP and then transferred to the server over a hidden encrypted SSID.

Figure 4:
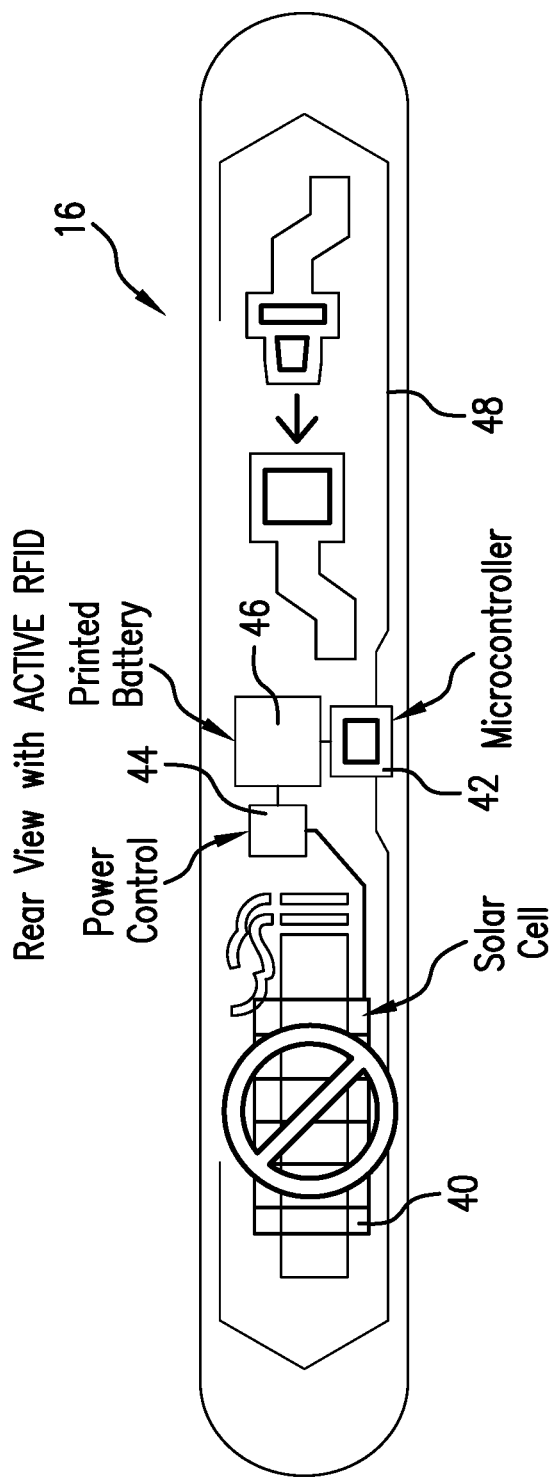
FIG. 4 illustrates the rear view of the placard of FIG. 2 showing an active tag with energy harvesting.

FIGS. 2, 3 and 4 are examples of installation of a tag or placard.

FIG. 2 is an exemplary placard 30 used on aircraft to annunciate the smoking status of a flight 32 and whether a seat belt is required to be worn 34. Embedded in the placard 30 is an RFID inventory tag containing object specific identification information. Confirmation of the presence of devices associated with these inventory tags is required by regulatory bodies prior to take-off. On a narrow body aircraft for example, there are nearly 500 such tags which require user intervention to periodically check to ensure the associated devices are present. The system disclosed herein monitors the tags by actively querying the tags for presence and to compare the number and type of devices to a database configured for a particular aircraft. The number of tags and types may be specific to an aircraft platform or may also be user specific. The data base for comparison will need knowledge of the types and numbers of tags expected within FIG. 3 is a rear view of the placard 30 of FIG. 2. FIG. 3 shows an example of a tag with a passive RFID chip 16 and antenna 36 embedded in the placard 30. One advantage of this tag is low cost and easy implementation. The RFID chip 16 is powered by the RFID readers used throughout the aircraft and each RFID chip 16 reports its part number back to the host system. The system compares the number of tags and identity of the tags reporting to the number in the database. This data is then forwarded through an on-aircraft data collection system for transmission to the cockpit or to a ground maintenance crew. Alternatively, the data is digitally stored on the aircraft for a later download. This inventory data collection system identifies missing placards each time the WAP and RFID reader query the aircraft. The system removes human intervention as data collection and analysis may be completed autonomously.

One exemplary inventory process entails the steps of:
a.) At the end of a flight, there is a call for inventory. This call may be initiated by an automatic clock or by the crew;
b.) The WAP initiate an RFID read, either area by area or all at once.
c.) For passive RFIDs, the reader produces an electric field of sufficient strength for the RFID tag to harvest energy, wake up, send an identification code and then wait for the next pulse of energy to repeat the process;
d.) The RFIDs are read and compared by zone to known devices in that area:
  i) Check for presence based on database; and
  ii) Verify dates of dated items are still within a useable range;
e.) Send data from the reader to the WAP:
f.) Send a single message for no change if there is no change;
g.) Send a message, if needed, for changes from the least read. These changes may include dated material, failure to respond and missing items; and
h.) Wait for the next flight phase or commanded inventory check.

FIG. 4 is an example of an active tag with energy harvesting that, in one embodiment, utilizes solar power. A solar cell 40 is placed strategically on placard 16 at a location where back lighting from the vehicle can be harvested to power a microcontroller 42. In addition, the solar cell 40 may convert ambient light passed through the placard 16. Placards that are backlit are made of a translucent material, such as a white polyester, to allow light to pass from the rear to the front for visibility of the light status. The translucent material enables light transmission in either direction through to the solar cell 40 for harvesting.

Particular attention is paid to sizing the solar cell 40, power control 44 and energy storage 46 for the purpose the microcontroller 42 serves. In one embodiment, the microcontroller 42 may only monitor if the tag is present. In an alternative embodiment, the microcontroller 42 may, through Doppler Effect and use of multiple wireless antennas 48, triangulate its location within the aircraft to ensure the tag has not separated from its location and moved inadvertently to another location such as in the case of an adhesive failure.

Figure 5:
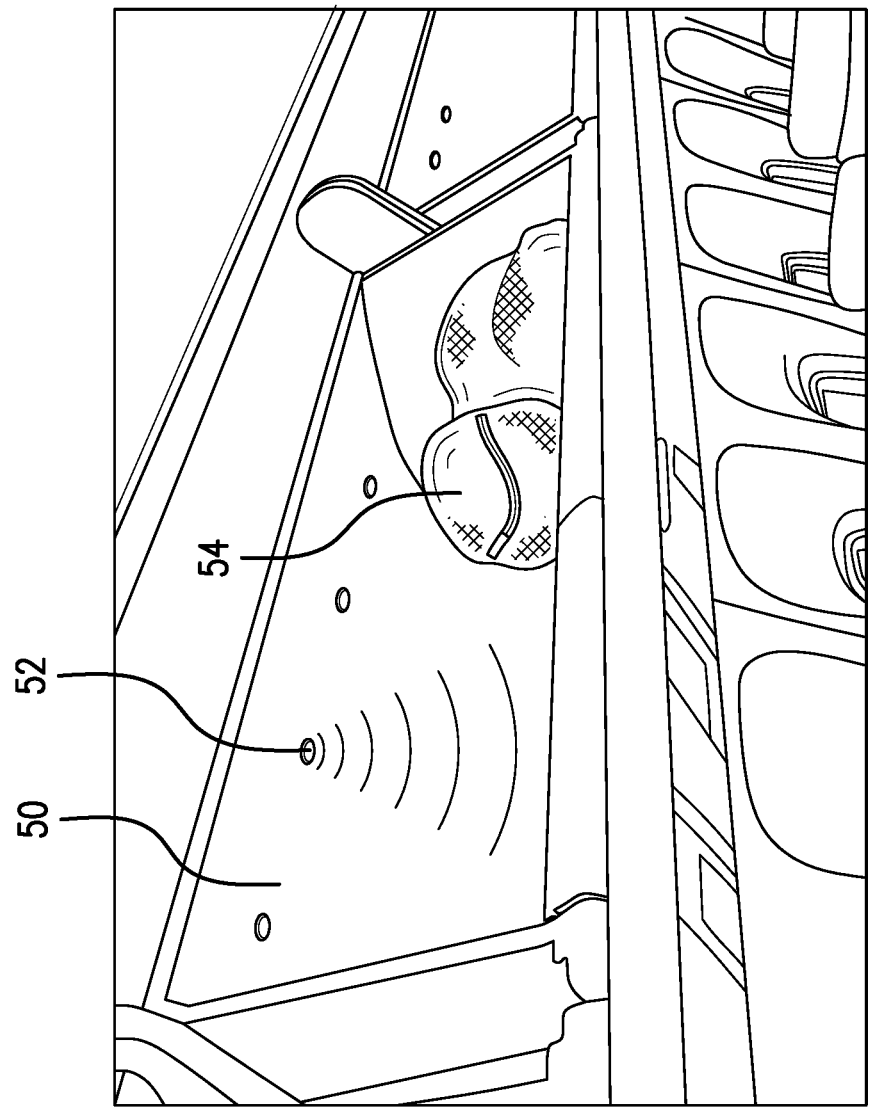
FIG. 5 illustrates a tag and sub-system for use as a stowage bin volume sensor.

FIGS. 5 and 6 illustrate examples of a sensor coupled to an active tag, such as a stowage bin 50 volume sensor 52. In the stowage bin 50 volume sensor 52 system, the active tag includes a microcontroller 42 in electrical communication with multiple proximity sensors 52. Each proximity sensor 52 monitors a distance from the sensor 52 to an item 54 in the bin 50. This distance is transmitted through a data buss to the microcontroller 42 where the distance is compared to an empty bin reading taken prior to loading of luggage. The microcontroller 42 then calculates a relative volume remaining within the bin 50. An RFID reader periodically queries microcontroller 42 through radio 45 for the volume remaining from the active tag and transmits this information to the flight crew or ground crew. Radio 45 allows for communication from the sensor either to the RFID reader or in other embodiments to the WAP directly. Radio 45 is bi-directional transmit and receive of any suitable frequency band to match the RFID reader, WAP or other wireless communication bus. The information may also be transmitted to a display visible to passengers looking to stow items in the bins either with or without the bin being closed.

The microcontroller 42 is powered from an energy harvesting device 40 feeding an energy storage device 46 to operate the volume sensors 52 allowing autonomous operation.

As one example, a solar cell 40 is connected to a power converter 44 operated to boost the voltage of the solar cell 40 to a storage device charging voltage to allow storage of the energy in a small coin cell, silicon battery 46, supercapacitor or other suitable storage device. Since the storage bin sensor 52 is only active during initial loading of passengers, there are many hours of opportunity for the energy harvester to store energy for operational use. A typical loading time is in the range of 10-30 minutes with a flight time of typically 2 hours. Within the operational time, the volume sensor 52 is queried by the network system once every minute or so. The microcontroller 42 wakes from a sleep mode where it consumes 10-20 uAmps of current on average, communicates with each of N number of sensors 52, calculates the volume available, sends that data to the querying system and then goes back to sleep. The time for measurement and communication is typically less than 10 millisecond. During this period, the microcontroller 42 and sensors 52 require about 50 mAmps of peak current. This extremely low duty cycle of less than 1% during the operational time and less than 0.1% overall, allows the system to harvest energy from many available sources such as RF, solar or vibration.

FIG. 7 illustrates and additional sensor board to attach to the main sensor board of FIG. 6. Up to 6 sensor boards may be attached to the example design.

Figure 8A:
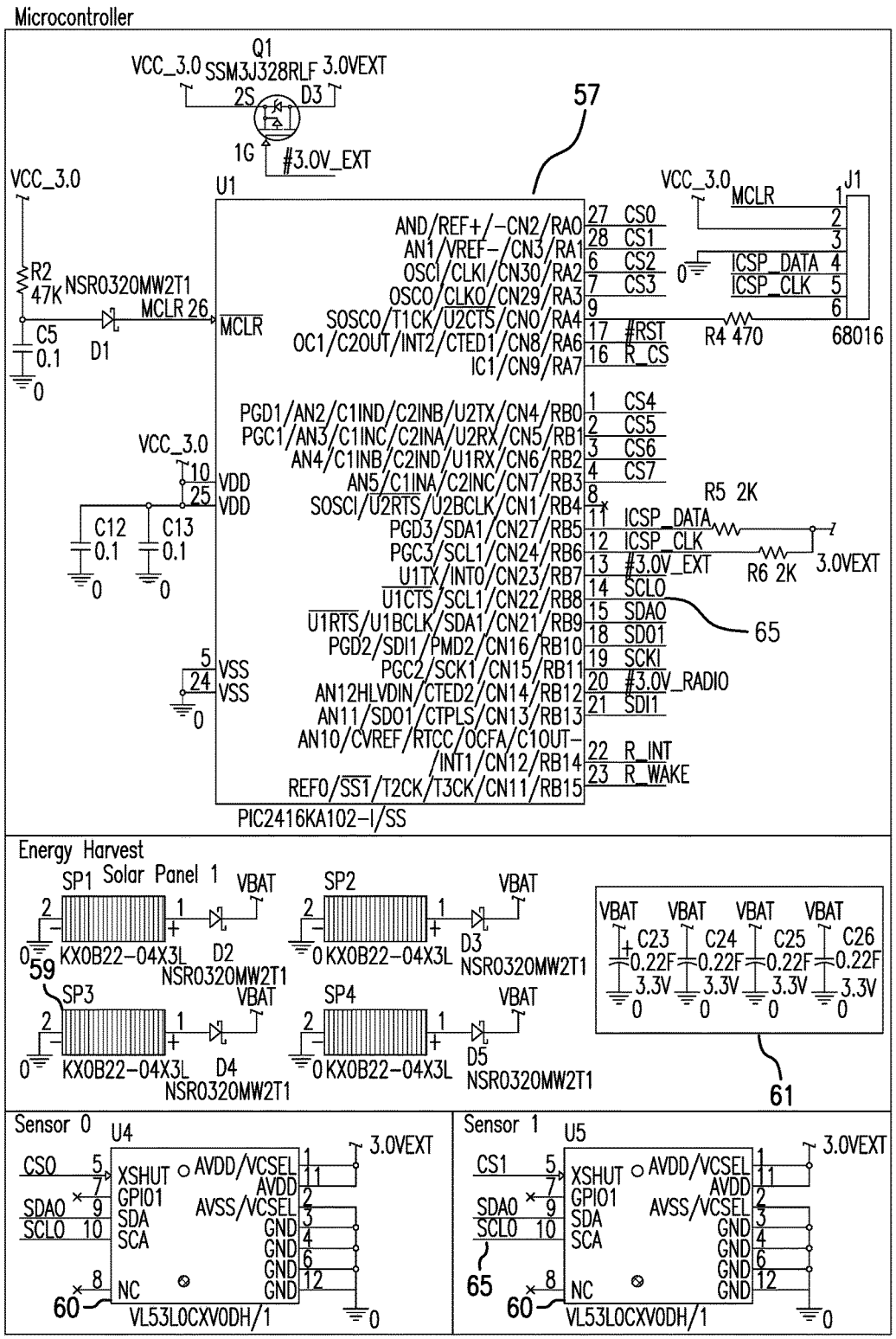
FIG. 8A illustrates a schematic of a first portion the sensor of FIG. 6.
Figure 8B:
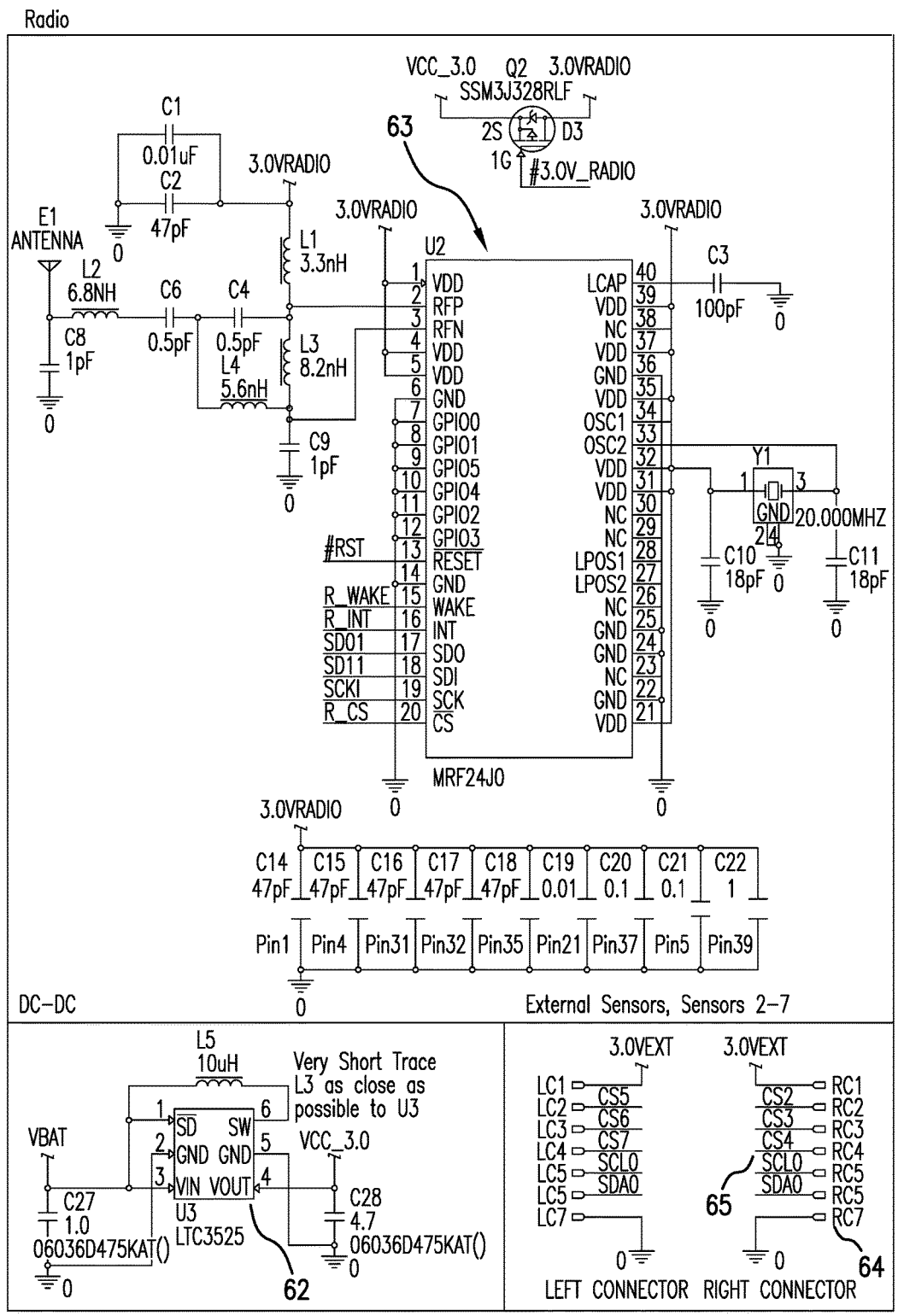
FIG. 8B illustrates a schematic of a second portion the sensor of FIG. 6.

FIGS. 8A and 8B illustrate a schematic diagram of an example circuit for the storage bin sensor. Microcontroller 57 operates to collect data from a multitude of distance sensors 60 through a serial communication bus 65. After sequentially communicating with the distance sensor, data is collected within the microcontroller non-volatile memory. The data is compared to the distance data taken when the storage device is empty. The percentage of change is calculated as a percentage of volume consumed. The Microcontroller 57, then transmits this data to the radio when the external WAP or RFID reader commands this storage bin sensor to report the volume consumed. The Microcontroller sets the data to the Radio for presentation over a wireless link to the WAP or RFID reader. Solar panels 59, harvest energy from ambient light and store this energy in supercapacitors 61. Energy stored in the supercapacitors 61 is boosted to 3.0 VDC to be used by the microcontroller 57 and radio 63 by DC-DC converter 62. Microcontroller operational code is loaded through the interface 58. Connections to other sensors 64 are used to add sensor boards in FIG. 6 increasing the number of sensors measurable. The number of sensors is limited to the number required to perform operation coverage of the volume of the bin. Long narrow bins may require as many as 8 sensors or more while a more square bin many only require 4, Others may only require 2 sensors. The number of sensors supported is a design choice driven by the shape and size of the storage space to be monitored.

I claim:

1. A system to monitor and to reporting a status of assets on a vehicle, comprising:
    a plurality of RFID tags, each RFID tag affixed to a particular asset and containing digitally stored information about the particular asset;
    a plurality of RFID readers mounted to said vehicle and positioned such that each one of the plurality of RFID tags is within communication range with at least one RFID reader;
    a data delivery system effective to digitally transmit information from the plurality of RFID readers to a data collection system;
    a secure interface disposed between the data collection system and a communication system; and
    the communication system effective to transmit the information to one or more of a flight crew and a ground crew.

2. The system of claim 1 wherein at least one of the RFID tags is an active tag.

3. The system of claim 2 wherein at least one of the RFID tags is a passive tag.

4. The system of claim 2 wherein the active tag is connected to a power source.

5. The system of claim 2 wherein the active tag is connected to an energy harvester.

6. The system of claim 5 wherein the energy harvester is effective to harvest energy from a source selected from the group consisting of a light source, a thermal source, a vibration source, an RF source and combinations thereof.

7. The system of claim 6 further including an energy storage system.

8. The system of claim 7 wherein the energy storage system is selected from the group consisting of rechargeable batteries and capacitors.

9. The system of claim 6 wherein the energy harvester is a solar cell and at least a portion of the particular asset adjacent to the solar cell is light transmitting.

10. The system of claim 1 wherein the data delivery system is selected from the group consisting of an Ethernet interconnect and a wireless connection.

11. The system of claim 10 wherein the secure interface is protected by a service set identifier (SSID).

12. A system to monitor and to reporting a status of assets on a vehicle, comprising:
    a sensor in communication with an asset and effective to monitor a property of the asset;
    an RFID tag affixed to the asset and in communication with the asset, the RFID tag containing digitally stored information about the asset;
    an RFID reader mounted to said vehicle and positioned such that the RFID tag is within communication range with the RFID reader;
    a data delivery system effective to digitally transmit information from the RFID reader to a data collection system;
    a secure interface disposed between the data collection system and a communication system; and
    the communication system effective to transmit the information to one or more of a flight crew, a ground crew and a display.

13. The system of claim 12 wherein the sensor is effective to measure a property selected from the group consisting of a flashlight charge, an oxygen bottle pressure, a fire extinguisher pressure and a storage bin volume.

14. The system of claim 13 wherein the sensor measures storage bin volume and the display is mounted on the vehicle.

15. The system of claim 13 wherein the sensor measures storage bin volume and the display is contained within a passenger's personal electronic device.

16. The system of claim 13 wherein the sensor is a proximity sensor.

17. The system of claim 13 wherein at least one of the RFID tags is an active tag.

18. The system of claim 17 wherein the active tag is connected to an energy harvester.

19. The system of claim 18 further including an energy storage system.

20. The system of claim 19 wherein the energy storage system is selected from the group consisting of rechargeable batteries and capacitors.

* * * * *